United States Patent [19]

Krusche

[11] Patent Number: 5,168,950
[45] Date of Patent: Dec. 8, 1992

[54] REGULATING SYSTEM FOR THE REGULATION OF THE DRIVING TORQUE OF THE INTERNAL COMBUSTION ENGINE OF A MOTOR VEHICLE

[75] Inventor: Heinz Krusche, Friedberg, Fed. Rep. of Germany

[73] Assignee: Bayerische Motoren Werke AG, Fed. Rep. of Germany

[21] Appl. No.: 276,803

[22] Filed: Nov. 28, 1988

[30] Foreign Application Priority Data

Nov. 28, 1987 [DE] Fed. Rep. of Germany ....... 3740433

[51] Int. Cl.$^5$ .......................... B60K 29/16; B60T 8/32
[52] U.S. Cl. ................................. 180/197; 364/426.02
[58] Field of Search ..................... 180/197; 364/426.02

[56] References Cited

U.S. PATENT DOCUMENTS

| | | | |
|---|---|---|---|
| 4,651,290 | 3/1987 | Masaki et al. | 364/426.02 X |
| 4,682,667 | 7/1987 | Hosaka | 364/426.02 X |
| 4,721,176 | 1/1988 | Kabasin et al. | 180/197 |
| 4,768,608 | 9/1988 | Hrovat | 180/197 |
| 4,811,808 | 3/1989 | Matsumoto et al. | 180/197 |
| 4,843,552 | 6/1989 | Inagaki | 180/197 |

FOREIGN PATENT DOCUMENTS

| | | | |
|---|---|---|---|
| 64669 | 11/1982 | European Pat. Off. | 180/197 |
| 2832739 | 2/1980 | Fed. Rep. of Germany | 180/197 |
| 3205627 | 11/1982 | Fed. Rep. of Germany . | |
| 3206694 | 9/1983 | Fed. Rep. of Germany | 180/197 |
| 3603765 | 8/1986 | Fed. Rep. of Germany . | |
| 3545652 | 6/1987 | Fed. Rep. of Germany . | |
| 3545012 | 7/1987 | Fed. Rep. of Germany . | |
| 3705983 | 9/1987 | Fed. Rep. of Germany . | |
| 3713374 | 10/1987 | Fed. Rep. of Germany . | |
| 90217 | 6/1982 | Japan | 180/197 |
| 167845 | 10/1983 | Japan | 180/197 |
| 11439 | 1/1988 | Japan | 180/197 |
| 11441 | 1/1988 | Japan | 180/197 |
| 38034 | 2/1988 | Japan | 180/197 |

*Primary Examiner*—Mitchell J. Hill
*Attorney, Agent, or Firm*—Evenson, Wands, Edwards, Lenahan & McKeown

[57] ABSTRACT

In a regulating system for the regulation of the driving torque of an internal combustion engine of a motor vehicle, in which wheel slippage occurring at the driven wheels of the motor vehicle are detected according to magnitude and in which the driving torque of the internal combustion engine is reduced, when exceeding a slippage threshold, value by a wheel slippage signal indicating the magnitude of the wheel slippage of a driven wheel, the friction coefficient effective in each case in the wheel circumferential direction is determined as measure for the road condition, and the slippage threshold determinable for the driven wheels is changed in dependence on the respectively determined friction coefficient effective in the wheel circumferential direction.

28 Claims, 4 Drawing Sheets

REGULATING SYSTEM FOR THE REGULATION OF THE DRIVING TORQUE OF THE INTERNAL COMBUSTION ENGINE OF A MOTOR VEHICLE

BACKGROUND AND SUMMARY OF THE INVENTION

The present invention relates to a regulating system for the regulation of the driving torque of the internal combustion engine of a motor vehicle, in which wheel slippage occurring at the driven wheels of the motor vehicle is detected according to magnitude and in which upon exceeding a slippage threshold the driving torque of the internal combustion engine is reduced by a wheel slippage signal indicating the magnitude of the wheel slippage of a driven wheel.

In order to be able to transmit a certain lateral guide force between the driven wheels of a motor vehicle and the road surface, a noticeably greater wheel slippage is permitted in case of a high tire-road interface friction coefficient than in case of a low friction coefficient. For assuring a sufficiently large lateral guide force between the driven wheels of a motor vehicle and the road surface, also in case of a low friction coefficient, the slippage threshold value must therefore be designed for the low friction coefficient. This entails the disadvantage that in case of high friction coefficient, with which a greater wheel slippage would be permissive, potential acceleration capabilities of the motor vehicle cannot be utilized.

A system for the propulsion regulation in motor vehicles is already known from the DE-OS 35 45 652 in which one of three different slippage thresholds can be effectively engaged in dependence of a signal reproducing the longitudinal acceleration of the motor vehicle. As only three different slippage thresholds are provided with this known system, a matching of the slippage threshold to the different friction coefficients is possible only inadequately. As additionally the effective engagement of one of the three different slippage thresholds takes place in the known system in dependence on a signal indicating the longitudinal acceleration of the motor vehicle, the desired matching of the slippage threshold to the friction coefficient effective between the driven wheels of the motor vehicle and the road surface is also attained only inadequately even without this reason. This can be traced back to the fact that the measured longitudinal acceleration of the motor vehicle is only in a very rough relationship to the friction coefficient effective between the driven wheels of the motor vehicle and the road surface because the longitudinal acceleration of the motor vehicle, in addition to depending from the friction coefficient, also depends additionally from the yaw angle of the motor vehicle, on the one hand, and from the load of the motor vehicle, on the other. Finally, the known system is costly from a manufacturing point of view and therewith can be realized only in a relatively expensive manner because at least a separate longitudinal acceleration sensor is required. If therebeyond, for purposes of improving the regulating quality, the only very rough relationship of the measured longitudinal acceleration of the motor vehicle to the friction coefficient effective between the driven wheels of the motor vehicle and the road surface is to be improved, then additionally the steering angle has to be measured, respectively, determined with the assistance of a separate steering angle sensor and the load of the motor vehicle with the assistance of an additional load sensor. Even with the use of a longitudinal acceleration sensor, of a steering angle sensor and of a load sensor, an auxiliary signal determined with the assistance of these sensors produces changes of the friction coefficient between the driven wheels of the motor vehicle and the road surface only with delay because in case of an abrupt change of the friction coefficient between the driven wheels of the motor vehicle and the road surface, the longitudinal acceleration of the motor vehicle changes only with a delay in time by reason of the mass inertia of the motor vehicle.

It is therefore the object of the present invention to provide a regulating system of the aforementioned type by means of which an optimum as regards driving stability and propulsion of the motor vehicle is attained with minimum expenditure.

The underlying problems are solved according to the present invention in that the friction coefficient effective in each case in the wheel circumferential direction is determined as measure for the road condition and in that the threshold slippage determinative for the driven wheels is changed in dependence on the friction coefficient determined in each case and effective in the wheel circumferential direction.

As the friction coefficient effective in the wheel circumferential direction is in a very exact relationship to the friction coefficient altogether effective between the driven wheels of the motor vehicle and the road surface, a very exact and dynamically delay-free matching of the slippage threshold to the friction coefficient altogether effective between the driven wheels of the motor vehicle and the road surface is achieved by the change of the slippage threshold determinative for the driven wheels as a function of the respectively determined friction coefficient effective in the wheel circumferential direction. As a result of this matching of the slippage threshold to the friction coefficient effective at a given time between the driven wheels of the motor vehicle and the road surface, on the one hand, a sufficiently large lateral guidance force of the driven wheels of the motor vehicle is achieved in case of a low friction coefficient by reason of a correspondingly small slippage threshold and, on the other, in case of a high friction coefficient effective between the driven wheels of the motor vehicle and the road surface, an excellent propulsion or forward drive of the motor vehicle while maintaining at the same time a sufficiently large lateral guidance force of the driven wheels is achieved by reason of the then-correspondingly high slippage threshold. An optimum as regards driving stability and propulsion is achieved in this manner by the regulating system in accordance with the present invention with the most different friction coefficients.

For purposes of fine matching of the respective slippage threshold to the friction coefficient effective between the driven wheels of the motor vehicle and the road surface, the slippage threshold, according to another feature of the present invention, is continuously changed in dependence on the respectively determined friction coefficient effective in the wheel circumferential direction.

Preferably the slippage threshold is thereby changed proportionally to the respectively determined friction coefficient effective in the wheel circumferential direction.

According to another feature of the present invention, the velocity of the driving torque reduction taking place in case of a regulating interaction, respectively, of the subsequent driving torque increase is changed in dependence on the respectively determined friction coefficient effective in the wheel circumferential direction. It is achieved thereby that with a small friction coefficient effective between the driven wheels of the motor vehicle and the road surface a slow driving torque reduction, respectively, a subsequent slow driving torque increase takes place whereby the driven wheels of the motor vehicle are brought up to their slippage limit with slight torque excess. In case of a large friction coefficient effective between the driven wheels of the motor vehicle and the road surface, the velocity of the driving torque change can be considerably greater because, in this case, the excess driving torque is not excessive also with a very powerful internal combustion engine of the motor vehicle. The change of the velocity of the driving torque change in dependence on the respectively effective friction coefficient entails advantages as regards an optimum driving stability with best propulsion, especially with a non-homogeneous road surface.

According to a still further feature of the present invention, the velocity of the driving torque reduction, respectively, of the driving torque increase taking place in case of a regulating interaction is changed continuously in dependence on the respectively determined friction coefficient effective in the wheel circumferential direction. As a result of this continuous change, a very good matching of the respective driving torque change velocity to the respective friction coefficient effective between the driven wheels of the motor vehicle and the road surface is achieved.

Preferably, the velocity of the driving torque reduction, respectively, increase taking place in case of a regulating interaction is changed proportionally to the respectively determined friction coefficient effective in the wheel circumferential direction.

According to a further feature of the present invention, the respective friction load, i.e., the wheel circumferential force in relation to the respective wheel load and transmitted by a driven wheel onto the road surface is determined as function of the detected wheel slippage, i.e., the respective friction load-wheel slippage-characteristic curve is determined and the maximum of this friction load-wheel slippage-characteristic curve is determined at least approximately for determining the friction coefficient effective in each case in the wheel circumferential direction. In this manner, the respective friction coefficient effective in the wheel circumferential direction can be determined very accurately.

For determining the friction coefficient of the road side with the poorer road condition and therewith for taking into consideration the traction behavior of the more critical driven wheel, the friction load-wheel slippage-characteristic curve is determined in each case for the driven wheel at which the largest wheel slippage occurs.

Preferably, the at least approximate determination of the maximum of the respective friction load-wheel slippage-characteristic curve takes place by determining a characteristic drop of the characteristic curve slope. In this manner, the maximum of the respective friction load-wheel slippage-characteristic curve, i.e., the friction coefficient effective in the wheel circumferential direction, can be determined very rapidly so that the desired friction coefficient is available in each case without delay. This contributes considerably to a dynamically rapid and therewith very accurate regulation of the driving torque of the internal combustion engine of a motor vehicle.

According to a further advantageous construction of the present invention, the wheel circumferential force required in each case for the determination of the respective friction load is calculated on the basis of the driving torque of the internal combustion engine, the gear ratio of the transmission, the number of the driven wheels and the radius thereof.

The driving torque of the internal combustion engine of the motor vehicle is thereby determined according to a still further feature of the present invention in a simple manner on the basis of the position of the power-adjusting member, for example, of the throttle valve and of the rotational speed of the internal combustion engine.

Reference is thereby had advantageously to a stored family of characteristic curves reproducing the driving torque of the internal combustion engine in dependence on the position of the power output member and of the rotational speed of the internal combustion engine.

The wheel slippage necessary for determining the friction coefficient effective in the wheel circumferential direction, which is necessary in addition to the friction load, is detected according to another advantageous feature of the present invention by a comparison of the rotational speed of the driven wheel with the rotational speed of the non-driven wheel of a vehicle side.

The exact determination of the wheel slippage thereby takes place by subtraction of the rotational speed of the non-driven wheel from the rotational speed of the driven wheel and by subsequent division of the subtraction result by the rotational speed of the non-driven wheel.

In the alternative, the wheel slippage can be determined by subtraction of the motor vehicle velocity from the wheel circumferential velocity of a driven wheel and by subsequent division of the subtraction result by the vehicle velocity.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein:

FIG. 2 is the friction load-wheel slippage diagram of FIG. 1, on an enlarged scale.

DETAILED DESCRIPTION OF THE DRAWINGS

Figure 1:
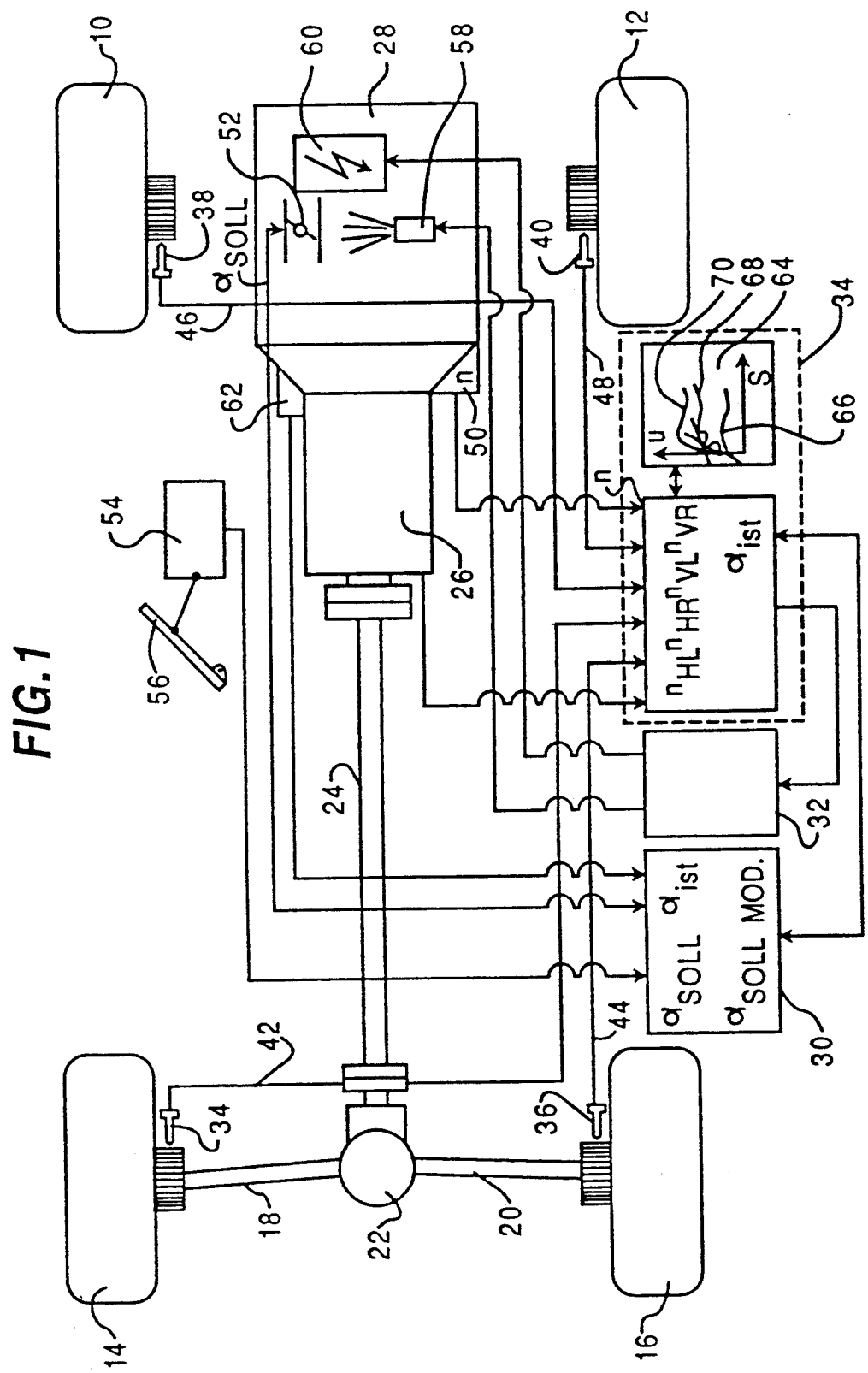
FIG. 1, 1A, 1B and 1C is a schematic block diagram of a drive arrangement of a motor vehicle equipped with a regulating system in accordance with the present invention; with FIG. 1 showing a combined control of throttle, fuel metering and ignition, FIG. 1A showing control of a throttle, FIG. 1B showing control of a fuel metering system and FIG. 1C showing control of an ignition system
Figure 1A:
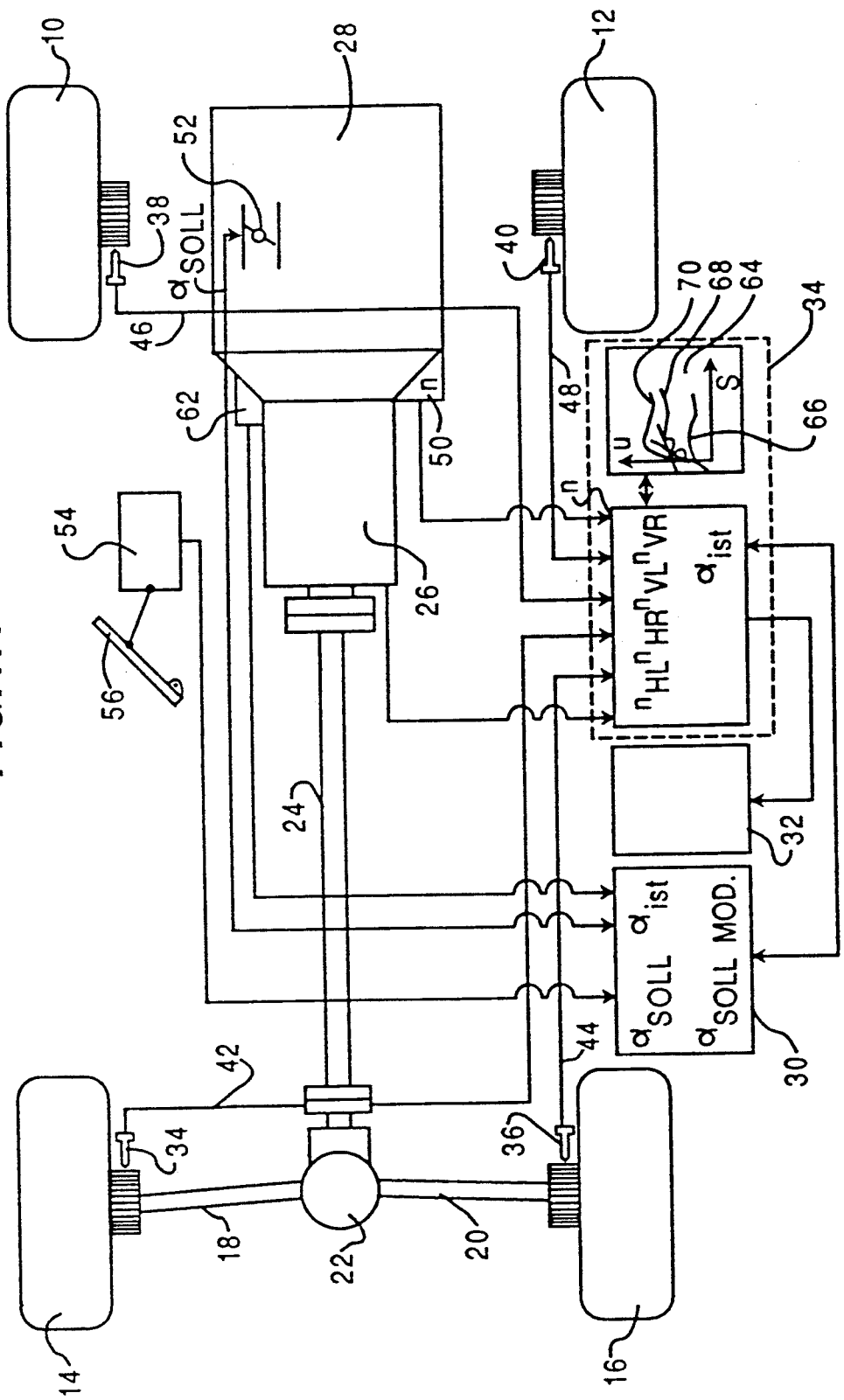
Figure 1B:
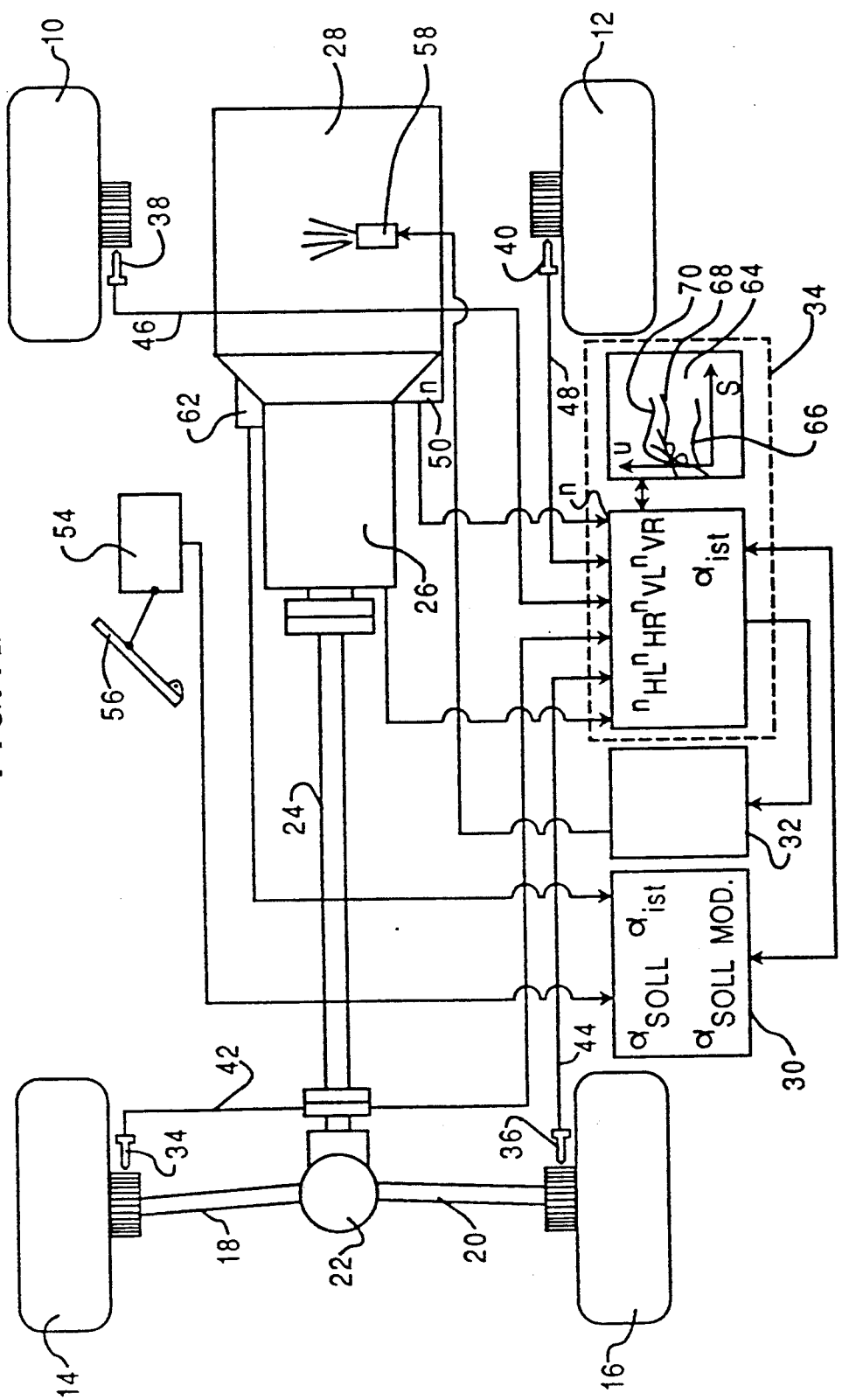
Figure 1C:
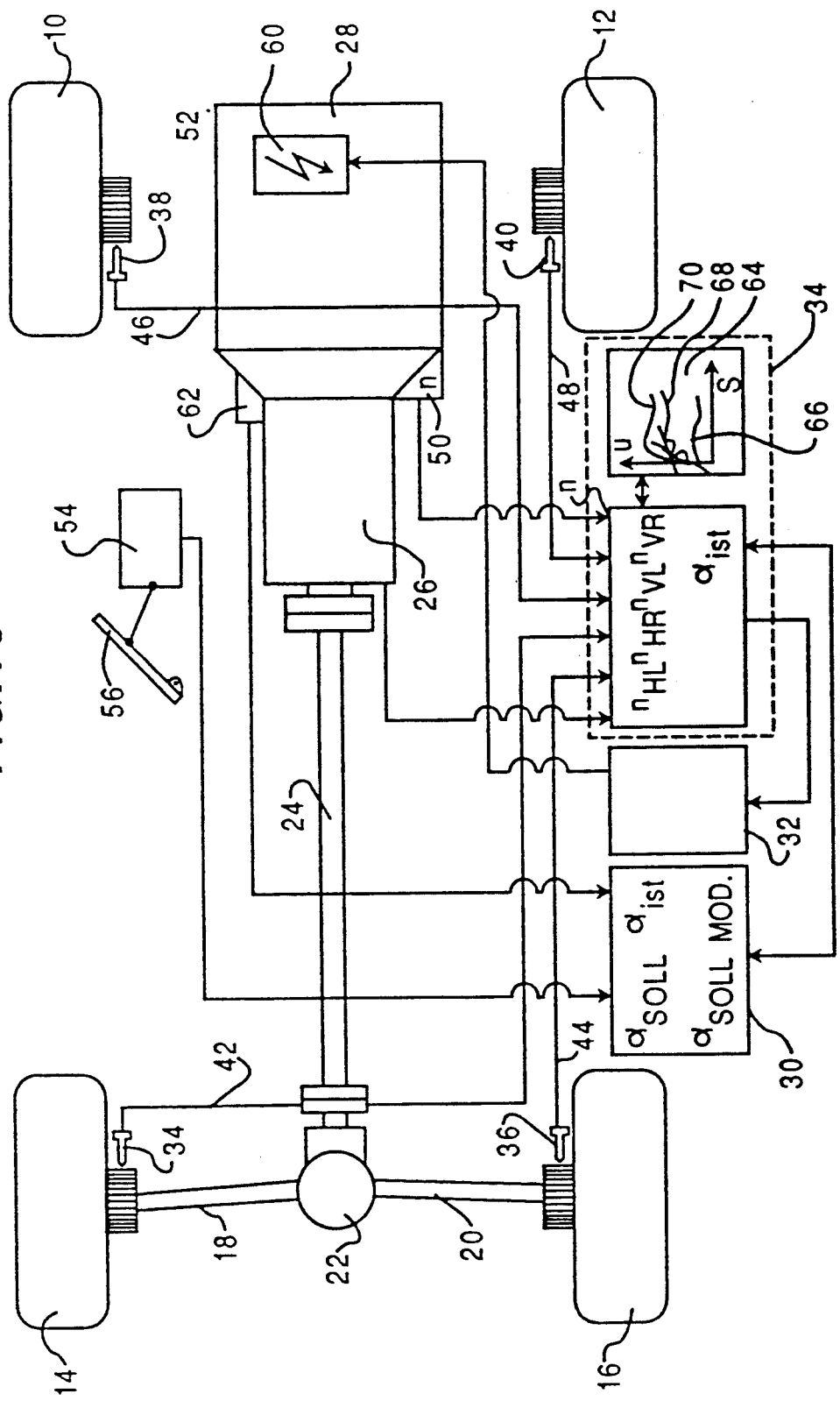

The drive arrangement of a motor vehicle illustrated in FIG. 1 consists essentially of the non-driven front wheels 10 and 12 as well as of the driven wheels 14 and 16 which are driven from an internal combustion engine 28 by way of the output shafts 18 and 20, an axle differential gear 22, a cardan shaft 24 and a change-speed transmission 26. This drive arrangement illustrated in this figure is equipped for the regulation of the driving torque of the internal combustion engine 28 with an electronic throttle valve regulating unit 30, with an electronic internal combustion engine control unit 32 as well as with a friction coefficient determination unit 34 indicated in dash line. The friction coefficient determination unit 34 is connected with wheel sensors 34, 36, 38 and 40 by way of electric input lines 42, 44, 46 and 48, by way of which the output signals of the wheel sensors 34, 36, 38 and 40 indicating the detected wheel rotational speeds $n_{HL}$, $n_{HR}$, $n_{VL}$ and $n_{VR}$ are transmitted to the friction coefficient determination unit 34. The latter additionally receives as input signals from the change-speed transmission 26 a signal indicating the respective transmission ratio, the engine rotational speed n detected by a rotational speed pick-up 50 as well as the respective throttle valve position actual value $\alpha_{ist}$ which is detected by a first potentiometer (not shown) arranged at the adjusting motor (also not shown) of the throttle valve 52 and is transmitted by way of the electronic throttle valve regulating unit 30 to the friction coefficient determination unit 34. The electronic throttle valve regulating unit 30 receives as further input signal the throttle valve position desired value $\alpha_{soll}$ desired by the driver which is detected with the aid of a drive pedal position pick-up 54 in the form of a second potentiometer and indicates the position of the drive pedal 56 desired by the driver. The electronic throttle valve regulating unit 30 additionally receives from the friction coefficient determination unit 34 a signal in case of wheel slippage occurring at the driven wheels 14 and 16 which indicates a modified throttle valve position desired value $\alpha_{sollmod}$. The friction coefficient determination unit 34, in case of wheel slippage occurring at the driven wheels 14 and 16, produces a further output signal transmitted to the electronic internal combustion engine control unit 32, by means of which the latter is so controlled in a first regulating step that for the dynamically rapid reduction of the driving torque of the internal combustion engine 28, the fuel metering device 58 thereof and/or the ignition device 60 thereof for individual cylinder units is or are turned off stepwise and/or timewise in dependence on the magnitude of the detected wheel slippage at the driven wheels 14 and 16. Only in a second regulating step, especially for the reduction of the excessive air component in the exhaust gas of the internal combustion engine 28, conditioned by the first regulating step, the air flow to be conducted thereto is reduced in dependence on the magnitude of the wheel slippage and of the magnitude of the output signal of an oxygen probe 62 in the exhaust gas channel of the internal combustion engine 28. The determination of the friction coefficient effective in the wheel circumferential direction takes place in the friction coefficient determination unit 34 by an evaluation to be explained more fully hereinafter of the respectively determined friction load-wheel slippage characteristic curve illustrated in this figure in the friction load-wheel slippage-diagram 64.

As the construction of the drive arrangement equipped with the regulating system according to the present invention for the regulation of the driving torque of the internal combustion engine of a motor vehicle has been essentially explained hereinabove, the function of the regulating system according to the present invention is to be explained more fully hereinafter by reference to FIGS. 1 and 2.

In the regulating system according to the present invention for the regulation of the driving torque of the internal combustion engine 28 of a motor vehicle, the respective friction load u, i.e., the wheel circumferential force U in relation to the respective wheel load G transmitted from a driven wheel 14 or 16 to the road surface is determined as function of the detected wheel slippage s, i.e., the respective friction load-wheel slippage-characteristic curve 66, 68, 70 (see especially FIG. 2) for the driven wheel 14 or 16 is determined, at which the largest wheel slippage s occurs, and at least approximately the maximum of this friction load-wheel slippage-characteristic curve 66, 68, or 70 is determined for the determination of the respective friction coefficients $\mu_U$ effective in the wheel circumferential direction. The respective wheel circumferential force U required for the determination of the respective friction load u is thereby calculated on the basis of the driving torque of the internal combustion engine 28, of the gear ratio of the transmission, of the number of the driven wheels 14, 16 and the radius thereof. The driving torque of the internal combustion engine 28 can be determined in a simple manner on the basis of the position $\alpha_{ist}$ of the throttle valve 52 and of the rotational speed n of the internal combustion engine 28. Preferably, reference is thereby had to a stored family of characteristic curves, not illustrated in the figures, reproducing the driving torque of the internal combustion engine 28 as a function of the position $\alpha_{ist}$ of the throttle valve 52 and of the rotational speed n of the internal combustion engine 28.

The respective wheel slippage s necessary additionally for the determination of the respective friction load-wheel slippage-characteristic curve 66, 68 or 70 is determined preferably by subtraction of the rotational speed $n_{VL}$ or $n_{VR}$ of the non-driven wheel 10 or 12 from the rotational speed $n_{HL}$ or $n_{HR}$ of the driven wheel 14 or 16 of a vehicle side and by subsequent division of the subtraction result by the rotational speed $n_{VL}$ or $n_{VR}$ of the non-driven wheel 10 or 12.

In the alternative, the wheel slippage s could also be determined by subtraction of the vehicle velocity determined, for example, with the assistance of a radar measuring device from the wheel circumferential velocity of a driven wheel 14 or 16 and by subsequent division of the subtraction result by the vehicle velocity.

If one plots the friction load u determined, respectively, in dependence on the detected wheel slippage s in the form of a functional relationship, then one obtains the respective friction load-wheel slippage-characteristic curve 66, 68 or 70 (see especially FIG. 2). By reference thereto, for example, of the friction load-wheel slippage-characteristic curve 66, the respective friction coefficient $\mu_U$ effective in the wheel circumferential direction between a driven wheel 14 or 16 and a road surface, for example, covered in this case with snow, can be determined by an at least approximate determination of its maximum. The slippage threshold determinative for the driven wheels 14 and 16 is then changed in dependence on the respectively determined friction coefficient $\mu_U$ effective in the wheel circumferential direction. In the illustrated embodiment of the invention, the slippage threshold is changed proportionally to the respectively determined friction coefficient $\mu_U$ effective in the wheel circumferential direction. In addition to the matching of the slippage threshold to the respectively determined friction coefficient $\mu_U$ effective in the wheel circumferential direction and therewith also to the friction coefficient $\mu$ altogether effective between the driven wheels 14 and 16 and the road surface, additionally the velocity of the driving torque reduction taking place with a regulating interaction, respectively, the subsequent driving torque increase is changed in dependence on the respectively determined friction coefficient $\mu_U$ effective in the wheel circumferential direction. This change of the velocity of the driving torque reduction, respectively, increase taking place with a regulating interaction preferably takes place thereby proportionally to the respectively determined friction coefficent $\mu_U$ effective in the wheel circumferential direction. It is achieved by this change of the velocity of the driving torque reduction, respectively, increase taking place in case of a regulating interaction in dependence on the respective friction coefficient $\mu$ effective between the driven wheels 14 and 16 that with a small friction coefficient $\mu$ the driving torque drop, respectively, rise, takes place slowly after a regulating interaction in order that the regulated driven wheel is again brought up to its slippage limit with a small driving torque excess whereas with a high friction coefficient $\mu$, this change velocity can be considerably greater because in this case also with powerful internal combustion engines the excess driving torque is not excessively large. This type of the regulation of the driving torque of the internal combustion engine 28 of a motor vehicle assures an optimum as regards driving stability and propulsion of a motor vehicle equipped with the regulating system according to the present invention especially with non-homogeneous road surfaces.

While I have shown and described only one embodiment in accordance with the present invention, it is understood that the same is not limited thereto but is susceptible of numerous changes add modifications as known to those skilled in the art, and I therefore do not wish to be limited to the details shown and described herein but intend to cover all such changes and modifications as are encompassed by the scope of the appended claims.

I claim:

1. A regulating system for regulating driving torque of an internal combustion engine of a motor vehicle, comprising detecting means for detecting a magnitude of wheel slippage occurring at driven wheels of the motor vehicle, and control means for reducing the driving torque of the internal combustion engine when driving wheel slippage exceeds a threshold value, by a wheel slippage signal indicating the magnitude of the slippage of a driven wheel including first means for establishing a determined respective friction coefficient effective in the wheel circumferential direction as a measure of road condition, and second means for changing the slippage threshold value for the driven wheels as a function of the determined friction coefficient effective in the wheel circumferential direction.

2. A regulating system according to claim 1, wherein the slippage threshold value is continuously changed in dependence on the respectively determined friction coefficient effective in the circumferential direction of the wheel.

3. A regulating system according to claim 2, wherein the slippage threshold value is changed proportionally to the respectively determined friction coefficient effective in the wheel circumferential direction.

4. A regulating system according to claim 2, wherein a rate of driving torque reduction which is effected via the control means is changed in dependence on the respectively determined friction coefficient effective in a wheel circumferential direction.

5. A regulating system according to claim 4, wherein the rate of the driving torque reduction is continuously changed in dependence on the respectively determined friction coefficient effective in a wheel circumferential direction.

6. A regulating system according to claim 5, wherein the rate of the driving torque reduction is changed proportionally to the respectively determined friction coefficient effective in a wheel circumferential direction.

7. A regulating system according to claim 5, wherein a respective friction load involving a wheel circumferential force in relation to a respective wheel load and transmitted by a driven wheel onto the road surface, is determined as function of the magnitude of the wheel slippage for producing a respective friction load-wheel slippage characteristic curve, and wherein the friction coefficient effective in a wheel circumferential direction is determined by a value at least approximately at a maximum of this characteristic curve.

8. A regulating system according to claim 7, wherein the friction load-wheel slippage characteristic curve is determined for the driven wheel which has a largest wheel slippage.

9. A regulating system according to claim 8, wherein the at least approximate determination of the maximum of the respective characteristic curve takes place by determining a characteristic drop of a characteristic curve slope.

10. A regulating system according to claim 9, wherein the respective wheel circumferential force is calculated on the basis of a driving torque of the internal combustion engine, a transmission ratio of the motor vehicle, a number of driven wheels on the vehicle and a radius of the driven wheels.

11. A regulating system according to claim 10, wherein the driving torque of the internal combustion engine is determined on the basis of a position of a power output member and rotational speed of the internal combustion engine.

12. A regulating system according to claim 11, wherein the power output member is the throttle valve.

13. A regulating system according to claim 11, wherein the driving torque of the internal combustion engine is determined with the assistance to a stored family of characteristic curves reproducing the driving torque of the internal combustion engine as a function of a position of the power output member and of the rotational speed of the internal combustion engine.

14. A regulating system according to claim 13, wherein the magnitude of the wheel slippage is determined by a comparison of rotational speed of the driven wheel with rotational speed of a non-driven wheel on a same motor vehicle side.

15. A regulating system according to claim 14, wherein the magnitude of the wheel slippage is determined by subtraction of the rotational speed of the non-driven wheel from the rotational speed of the driven wheel and by a subsequent division of the subtraction result by the rotational speed of the non-driven wheel.

16. A regulating system according to claim 14, wherein the magnitude of the wheel slippage is determined by subtraction of vehicle velocity from a wheel circumferential velocity of a driven wheel and by subsequent division of the subtraction result by the vehicle velocity.

17. A regulating system according to claim 1, wherein a rate of driving torque reduction, which takes place in response to the control means is changed in dependence on the respectively determined friction coefficient effective in a wheel circumferential direction.

18. A regulating system according to claim 17, wherein the rate of the driving torque reduction is continuously changed in dependence on the respectively determined friction coefficient effective in a wheel circumferential direction.

19. A regulating system according to claim 18, wherein the rate of the driving torque reduction is changed proportionally to the respectively determined friction coefficient effective in a wheel circumferential direction.

20. A regulating system according to claim 1, wherein wherein a respective friction load involving a wheel circumferential force in relation to a respective wheel load and transmitted by a driven wheel onto the road surface, is determined as function of the magnitude of the wheel slippage for producing a respective friction load-wheel slippage characteristic curve, and wherein the friction coefficient effective in a wheel circumferential direction is determined by a value at least approximately at a maximum of this characteristic curve.

21. A regulating system according to claim 20, wherein the friction load-wheel slippage characteristic curve is determined for the driven wheel which has a largest wheel slippage.

22. A regulating system according to claim 20, wherein the at least approximate determination of the maximum of the respective characteristic curve takes place by determining a characteristic drop of a characteristic curve slope.

23. A regulating system according to claim 20, wherein the respective wheel circumferential force is calculated on the basis of a driving torque of the internal combustion engine, a transmission ratio of the motor vehicle, a number of driven wheels on the vehicle and a radius of the driven wheels.

24. A regulating system according to claim 23, wherein the driving torque of the internal combustion engine is determined on the basis of a position of a power output member and rotational speed of the internal combustion engine.

25. A regulating system according to claim 24, wherein the driving torque of the internal combustion engine is determined with the assistance to a stored family of characteristic curves reproducing the driving torque of the internal combustion engine as a function of a position of the power output member and of the rotational speed of the internal combustion engine.

26. A regulating system according to claim 1, wherein the magnitude of the wheel slippage is determined by a comparison of rotational speed of the driven wheel with rotational speed of a non-driven wheel on a same motor vehicle side.

27. A regulating system according to claim 26, wherein the magnitude of the wheel slippage is determined by subtraction of the rotational speed of the non-driven wheel from the rotational speed of the driven wheel and by a subsequent division of the subtraction result by the rotational speed of the non-driven wheel.

28. A regulating system according to claim 1, wherein the magnitude of the wheel slippage is determined by subtraction of vehicle velocity from a wheel circumferential velocity of a driven wheel and by subsequent division of the subtraction result by the vehicle velocity.

* * * * *